R. O. HENDRICKSON.
GOVERNOR HEAD.
APPLICATION FILED JULY 3, 1911.
1,093,852.
Patented Apr. 21, 1914.
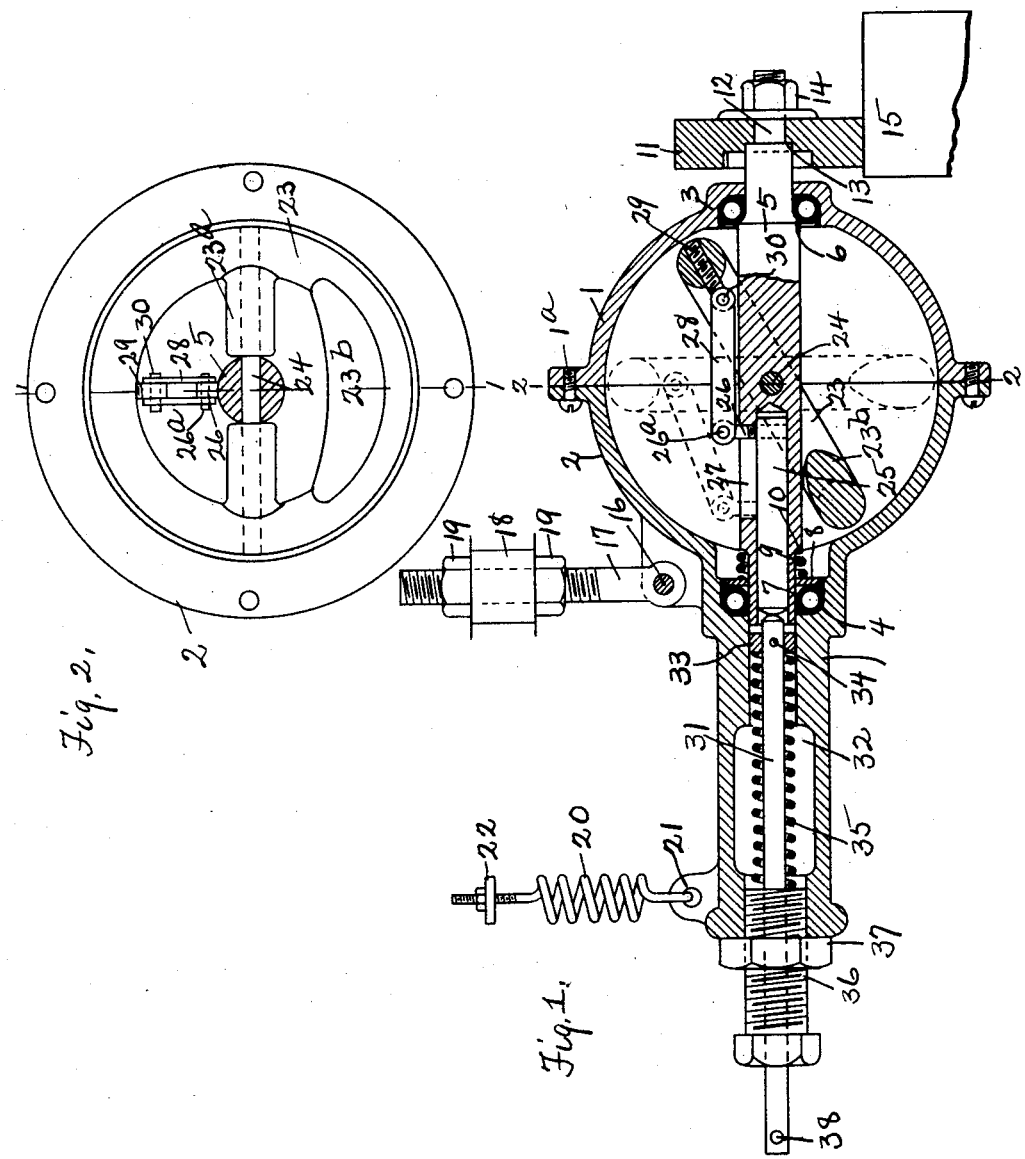
Witnesses
B. M. Hartman
Inventor
Robert O. Hendrickson
Attorney

UNITED STATES PATENT OFFICE.

ROBERT O. HENDRICKSON, OF PORTLAND, OREGON, ASSIGNOR, BY MESNE ASSIGNMENTS, TO WALLIS TRACTOR COMPANY, OF RACINE, WISCONSIN, A CORPORATION OF WISCONSIN.

GOVERNOR-HEAD.

1,093,852.  Specification of Letters Patent.  Patented Apr. 21, 1914.

Application filed July 3, 1911. Serial No. 636,812.

*To all whom it may concern:*

Be it known that I, ROBERT O. HENDRICKSON, a citizen of the United States, residing at Portland, in the county of Multnomah and State of Oregon, have invented new and useful Improvements in Governor-Heads, of which the following is a specification.

This invention relates to governor heads, and consists in certain improvements in the construction thereof as will be hereinafter fully described and pointed out in the claims.

The governor head forming the subject matter of this invention is more particularly designed for use on traction engines or in places where the governor is subjected to disturbing factors both incident to the violent jarring of the governor as a whole and the variations in the direction of the axis of the spindle with relation to the line of force incident to gravity.

The invention is illustrated in the accompanying drawings as follows:

Figure 1 is a central section of the head on the line 1—1 in Fig. 2. Fig. 2 a section on the line 2—2 in Fig. 1, the parts being removed to better show construction.

The governor frame is formed in two parts, 1 and 2 which are united by the screws 1ª. The frame forms a complete closure for the working parts of the governor, and is preferably ball shaped.

The frame is provided with the two bearing shoulders 3 and 4 in which are arranged the ball bearing race ways and the spindle 5 has the shoulders 6 operating with the race way 3 to form one bearing and the cup 7 operating with relation to the shoulder 4 to form the other bearing for the spindle. The cup 7 is preferably loose on the spindle and is contacted by a collar 8. The spring 9 is interposed between the collar 8 and the shoulder 10 on the spindle. In this way the adjustment of the ball bearings is automatically accomplished through the action of the spring.

The spindle is driven by a friction pulley 11. This is fixed on the extension 12 of the spindle and is clamped between the shoulder 13 formed between the extension 12 of the spindle proper and the nut 14 on the end of the spindle. The pulley 11 is driven by any convenient member, a fragment of which is shown as 15.

The frame is pivoted by means of a pin 16 on a bolt 17. The bolt is carried by a bracket 18 and is adjustable therein by means of the nuts 19. The friction pulley is held to its work by means of a spring 20 which is secured to a perforated ear 21 on the frame 2 and a suitable anchor 22.

The governor weight 23 is in the form of a ring, extending both sides of the spindle 5 and the body of the weight thus formed is arranged in opposite angles between two planes, one of which passes through the axis of the spindle and the axis of the pivot on which the weight is mounted and the other plane being at right angles to the first named plane and extending through the axis of the pivot 24. Ears 23ª extend inwardly from the ring and the pin 24 extends through these ears and the spindle. In this way, the weight is pivotally mounted on the spindle.

It will be observed that the body of the weight at the opposite sides of the spindle is balanced and that the center of gravity is at the axis of the pivot. It makes no difference, therefore, what the direction of the axis of the spindle may be, or how much the weight may be jolted. These do not disturb its operation in the least. The weight is only sensitive to movement incident to centripetal force. As it is rotated, the mass of the weight tends to move to the position shown in dotted lines in Fig. 1 and to the position shown in Fig. 2.

The governor pin 25 is arranged within the spindle and the screw 26 extends from the pin through the slot 27 in the spindle. Links 28 are secured to the screws 26 by means of the pins 26ª. The opposite ends of the links 28 are secured to the pin 30. The pin 30 is carried by the screw 29 which extends into the ring 23. The ring 23 is enlarged at 23ᵇ to counterbalance the links and screw 29. It will be observed that any movement of the weight 23 is communicated through the links 28 to the pin 25.

The pin 25 contacts a pin 31 journaled in the extension of the frame 2. The pin 31 extends through a cavity 32. A collar 33 is fixed on the end of the pin 31 by means of a locking pin 34. A spring 35 is tensioned between the collar 33 and a screw 36. The spring forms the centripetal element of the governor and it may be readily adjusted by means of the screw 36. The screw is locked in adjustment by the lock nut 37.

The stem 31 may be connected by the pin 38 with any device to be governed, the stem 31 really being the governing device.

What I claim as new is:

1. In a governor head, the combination of a governor frame; a spindle rotatively mounted in the frame; a weight pivotally mounted on the spindle; a centripetal element; a governing device actuated by the weight; and a pivotal mounting for the frame.

2. In a governor head, the combination of a governor frame; a spindle rotatively mounted in the frame; a weight pivotally mounted on the spindle; a centripetal element; a governing device actuated by the weight; a pivotal mounting for the frame; a friction pulley on the spindle; and means operating on the frame for forcing the friction pulley into engagement.

3. In a governor head, the combination of a pivoted governor frame; a spindle rotatively mounted in the frame; a weight pivotally mounted on the spindle; a centripetal element; a governing device actuated by the weight; a friction pulley on the spindle; and a spring engaging the frame on that side of its pivot opposite the friction pulley for forcing the latter into engagement with a moving surface.

4. In a governor head, a frame; a spindle journaled therein; a centrifugal weight pivoted on the spindle; means for revolving the spindle also mounted thereon; a pair of anti-friction bearings for the spindle within the frame and oppositely faced with respect to each other; a spring surrounding the spindle and interposed between an abutment thereon and one of said bearings to maintain the position of the spindle with reference thereto; means for offsetting the centrifugal action of the weight and connection from said weight to a governing device.

5. In a governor head, a frame; a rotary spindle journaled in the frame; a centrifugal weight pivoted transversely to the spindle; means for rotating the spindle; a pair of anti-friction bearings oppositely faced with respect to each other and supporting the spindle; a washer surrounding the spindle and covering one of said bearings; a spring interposed between said washer and an abutment of the spindle; means for offsetting the centrifugal effect of the weight; and connections from the weight to a governing device.

6. In a governor head, a frame; a spindle journaled in the frame having a concentric bore; a centrifugal weight transversely pivoted on the spindle; means for rotating the spindle; a governor pin sliding in said bore; connections from said pin to the weight; a second pin coaxial with the governor pin and adapted for connection to a governing device; and a spring for maintaining said second pin in contact with the governor pin and offsetting the centrifugal effect of the weight.

In testimony whereof I have hereunto set my hand in the presence of two subscribing witnesses.

ROBERT O. HENDRICKSON.

Witnesses:
H. V. CARPENTER,
ELIJAH CORBETT.

---

Copies of this patent may be obtained for five cents each, by addressing the "Commissioner of Patents, Washington, D. C."